United States Patent
Torelli et al.

[15] 3,667,626
[45] June 6, 1972

[54] SEALING MEANS

[72] Inventors: Aldo Torelli; Andre Jacquemet, both of Grand-Lancy, Geneva, Switzerland

[73] Assignee: Sandco Limited, Ottawa, Canada

[22] Filed: July 31, 1969

[21] Appl. No.: 846,366

[30] Foreign Application Priority Data

Aug. 1, 1968 Switzerland ...................... 115550/68
May 13, 1969 Switzerland ........................... 7327/69

[52] U.S. Cl. ............................................. 214/17 B, 34/242
[51] Int. Cl. ....................................................... F26b 25/00
[58] Field of Search .................................. 214/17 B; 34/242

[56] References Cited

UNITED STATES PATENTS

| | | | |
|---|---|---|---|
| 2,606,046 | 8/1952 | Bonner et al. | ............................ 34/242 |
| 2,654,587 | 10/1953 | Skivesen | ........................... 214/17 B X |
| 3,421,345 | 1/1969 | Schiffer et al. | ....................... 34/242 X |
| 3,460,359 | 8/1969 | Schiffer | ................................. 34/242 X |

*Primary Examiner*—Robert G. Sheridan
*Attorney*—Pierce, Scheffler & Parker

[57] ABSTRACT

In a sealing means between two members that are movable in relation to each other, one of the members having a sealing ridge which ridge is movable towards the other of said members forming a slit therewith, the sealing ridge is provided with a surface facing said other member, said surface being parallel with the surface of said other member, means are provided for biasing the sealing ridge in the direction towards said other member.

11 Claims, 7 Drawing Figures

SEALING MEANS

The present invention relates to sealing means between movable parts. It is known to use sealing means consisting of a frictional gasket between the parts. It is also known to use labyrinth seals in order to avoid the frictional contact.

The invention belongs to the frictionless type of seal and provides a sealing ridge that is movable on one of the movable parts and forms a narrow parallel slit with the other part, said slit being so narrow that it restrains the flow of a gas through the seal, thus permitting to maintain different static pressures on each side of the seal.

The invention will be described more particularly in the following specification and illustrated in the annexed drawings, in which.

Figure 1:
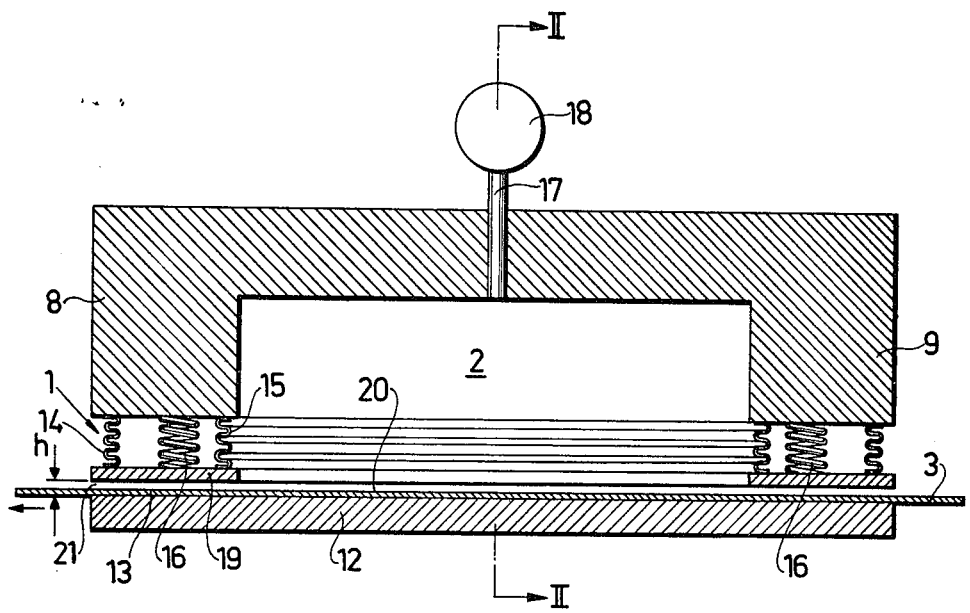
FIG. 1 is a vertical longitudinal section through a seal according to the invention, as used in a conveyor.
Figure 2:
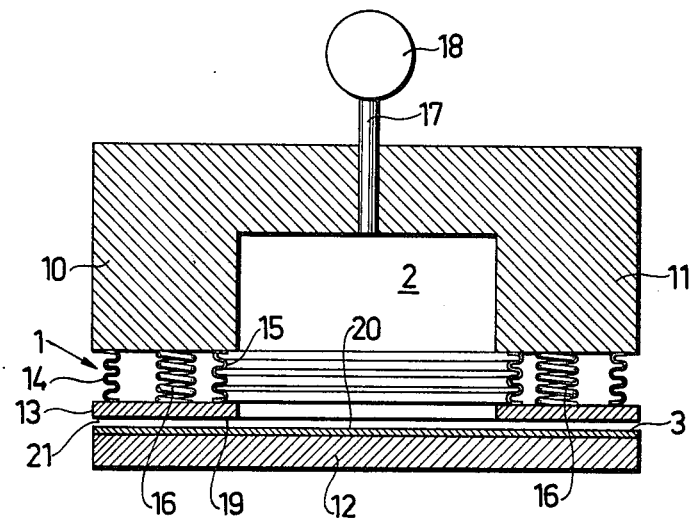
FIG. 2 is a vertical transverse section of the conveyor in FIG. 1, on line II—II.

In FIG. 1, a seal 1 is provided between a pressure chamber 2 and a conveyor belt 3, which latter is backed up by a fixed support 12. The seal is provided between the vertical walls 8, 9, 10 and 11 of the pressure chamber and the conveyor belt. In this embodiment, the seal consists of a strip 13 which is connected to the lower part of said vertical walls by means of bellows 14, 15, and spring 16 urge the strip 13 in the direction towards the belt 3.

The chamber 2 is fed by a pressure medium (either a fluid or a gas), for instance, at 10 kg/cm², through a conduit 17 leading from a pressure source 18. The pressure raises the strip 13 from the belt, the bottom surface of the strip 19 and the top surface 20 of the belt forming between them a slit 21 with parallel surfaces and height $h$. This height $h$ should be very small, for instance, in the size order of hundredths of a millimeter. The narrow slit will let through only a small quantity of the pressure medium and thus make it possible to maintain a superatmospheric pressure in the chamber 2, at the same time permitting the belt 3 to move without any frictional contact with the seals 1.

When the pressure fluid penetrates across the slit 21 the pressure diminishes towards the outer edge of slit, thereby causing a decreasing distribution of the specific pressure across the slit. Thus the resultant pressure will be situated closer to the inner edge than to the outer edge of the slit. Accordingly, in order to maintain the strip 13 parallel with the belt the springs 16 are placed closer to the inner edge of the strip as shown in the figures, the position of the springs corresponding to the pressure resultant.

Figure 3:
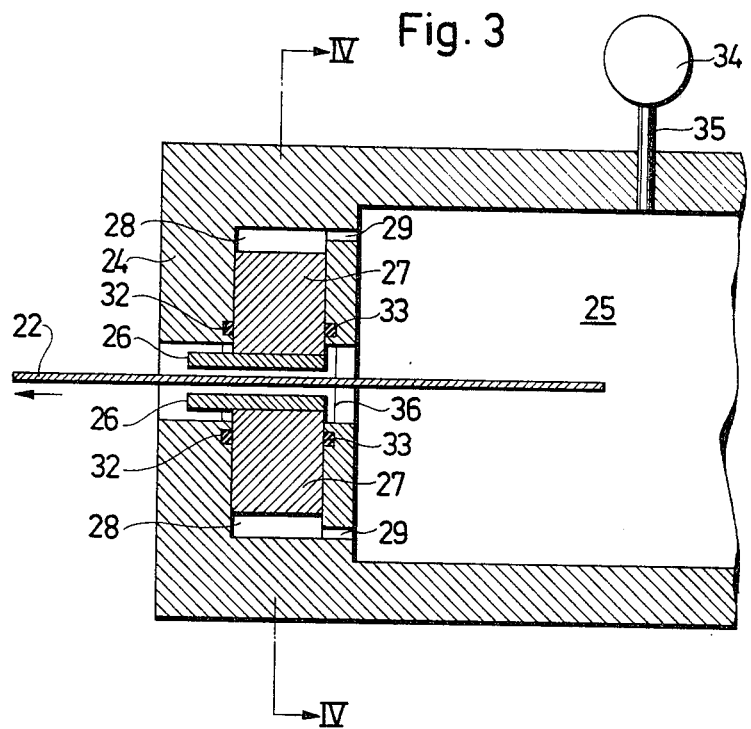
FIG. 3 is a vertical longitudinal section of a second embodiment of a seal according to the invention, likewise used in a conveyor.
Figure 4:
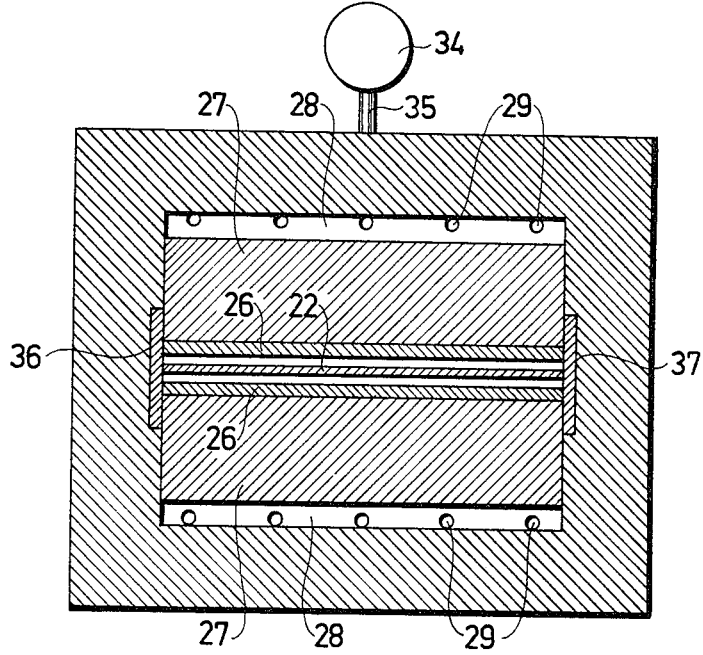
FIG. 4 is a vertical transverse section of the conveyor in FIG. 3, on line IV—IV.

In the embodiment in FIGS. 3 and 4 there is provided a pressure chamber 25 on each side of a conveyor belt means 22 which, in this case, consists of two separate conveyor belts with a material between them that is subjected to pressure treatment in the chamber. In this embodiment, the seals consist of a plunger 27 slidable in the recess 28 in the wall 24 of the pressure chamber 25 and projecting from the recess adjacent the belt means 22, where the plunger has a sealing strip 26. The plunger is sealed in the recess by seals 32 and 33. Behind the plunger 27 the recess is connected by a channel 29 to the pressure chamber 25.

The pressure on that side of the plunger which is remote from the belt means 22 will be constant over the whole surface of the plunger, while the pressure on that side which faces the belt means will drop from the inside to the outside. If the surfaces of both ends of the plunger were equally great, the resultant pressure on the rear side would become greater than the resultant pressure on the other side, thus pressing the plunger towards the belt means. In order to make the two pressures balance each other, the strip 26 is made broader than the rest of the plunger. In this way the strip 26 is maintained somewhat spaced from the belt means.

Another way of balancing the pressures is to connect the plunger to a separate pressure source instead of to the pressure chamber, thus making it possible to regulate the pressures independently of each other. In this way it may become superfluous to make the strip 26 broader than the plunger.

FIG. 4 shows how the side edges of the belt are sealed by means of resilient strips 36 and 37 along the side walls of the pressure chamber.

Figure 5:
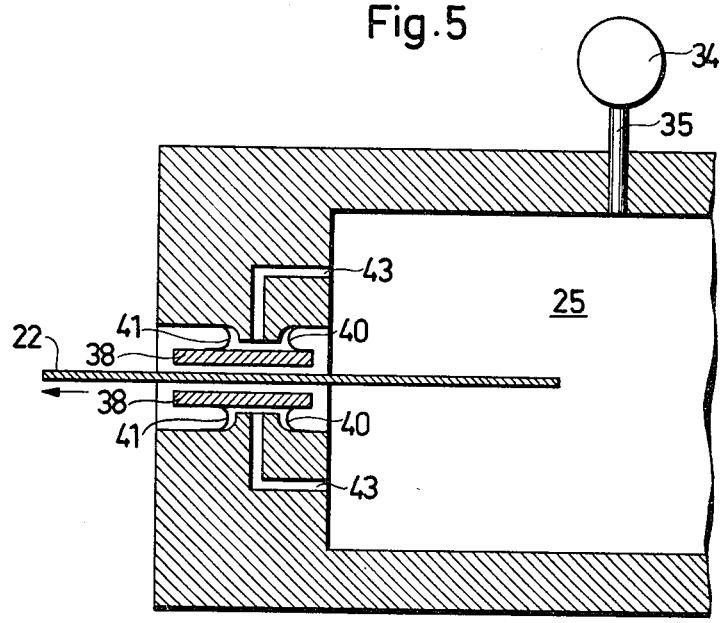
FIG. 5 is a vertical longitudinal section of a conveyor and showing a third embodiment of the invention.

FIG. 5 shows an embodiment in which there are not plungers but only sealing strips 38 attached to the walls of the pressure chamber by means of resilient ridges 40, 41.

As in the previous embodiment the pressure medium from the chamber 25 acts on the rear side of the strips 38 through the channel 43. The surface on which this action occurs is smaller than the surface of the strips facing the belt, thus obtaining equilibrium between the opposed pressures and allowing the strip to form a slit with the belt means 22.

Figure 6:
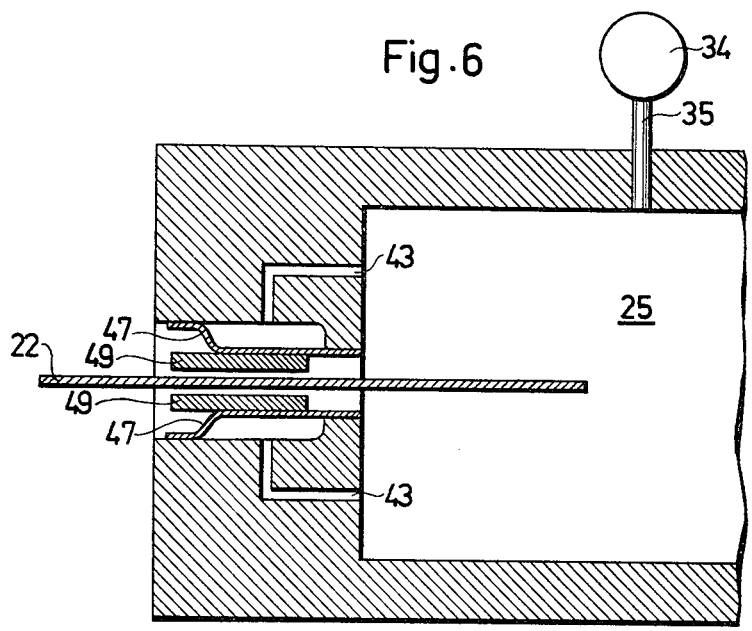
FIG. 6 is a vertical longitudinal section of a conveyor equipped with a fourth embodiment of the invention.

FIG. 6 shows a similar embodiment as in FIG. 5 with the exception that the spring device 47 carrying the strip 49 is somewhat modified.

Figure 7:
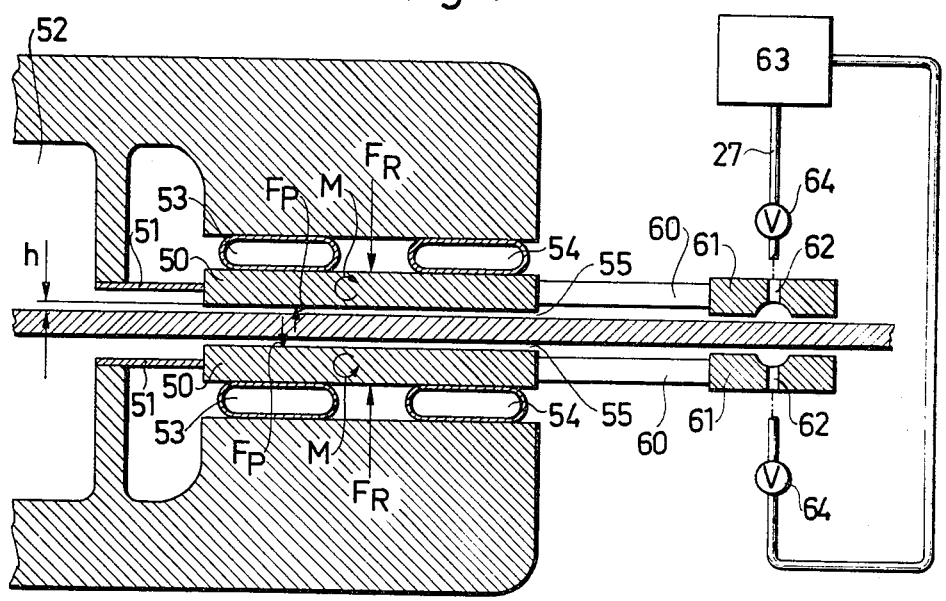
FIG. 7 is a vertical section of a conveyor showing use of a fifth embodiment of the invention.

FIG. 7 shows a sealing device adapted to ensure that the sealing strip is parallel with the conveyor belt. The sealing strips 50 are, in this embodiment, connected by a resilient strip 51 to the wall of the pressure chamber 52. On the rear side of each sealing strip there are two flexible tubes 53 and 54 which can be filled with a pressure medium. The resultant pressure $F_R$ on the strip is situated centrally between the tubes. The pressure medium escaping from the pressure chamber along the slits 55 has a resultant $F_P$ that is situated closer to the inner edge of the strip. The force couple $F_R$ and $F_P$ exerts a torque M on the strip 50. In order to counteract this torque, and to hold the strips 50 parallel with the belt, each of the strips is provided with a guiding device consisting of a lever arm 60 extending along the belt and carrying a disc 61 which is arranged to be supported on the belt by a tin film of air. For this purpose, the disc has a central channel 62 through which is fed air from a source 63 through conduits provided with valves 64, which valves are set to provide a flow of air that holds the discs 61 at a suitable small distance from the belt, thus also holding the sealing strips 50 parallel with the belt.

It is not necessary that discs be supported against the belt, but they can be supported against any fixed surface.

The advantage of the guiding device with the discs 61 is that the sealing strips 50 are automatically held in alignment with the belt, the torque from the discs 61 always being opposed to the torque M from the pressure acting on the sealing strips 50.

It would be possible to omit the discs 61 and the lever arms 60 and instead have a higher pressure in the tube 53 than in the tube 54, thus obtaining a resultant pressure that counterbalances the resultant pressure from the slit 55.

We claim:

1. Slit seal for sealing a movable part from a pressure chamber, preferably for sealing a conveyor belt running through a pressure chamber, which slit seal consists essentially of a yieldably mounted sealing ridge forming a slit with the movable part through which slit pressure medium flows, and means subjecting said ridge to a counterpressure acting against the pressure of the pressure medium in the slit, the resultant of the counterpressure being opposed to and aligned with the resultant of the pressure in the slit, thereby avoiding a tilting moment on the ridge.

2. Slit as defined in claim 1, in which the counterpressure means are springs.

3. Slit seal as defined in claim 1, in which a fluid pressure medium is used for subjecting the sealing ridge to said counterpressure.

4. Slit seal as defined in claim 3 in a pressure chamber for a conveyor, in which a channel connects the pressure chamber to the sealing ridge, the pressure medium in the pressure chamber thus constituting the counterpressure for the sealing ridge.

5. Sealing means as defined in claim 3 in a pressure chamber for a conveyor, in which there are separate pressure sources for the sealing ridge and for the pressure chamber.

6. Slit seal for sealing a movable part from a pressure chamber, preferably for sealing a conveyor belt running through a pressure chamber, which slit seal consists essentially of a yieldably mounted sealing ridge forming a slit with the movable part through which slit pressure medium flows, and means subjecting said ridge to a counterpressure acting against the pressure of the pressure medium in the slit, the resultant of the counterpressure being opposed to the resultant of the pressure in the slit, thereby avoiding a tilting moment on the ridge, said sealing ridge being provided with a guiding device, comprising a lever arm projecting therefrom, and, at its free end, carrying a pneumatic cushion device adapted to be fed by air forming an air cushion spacing said pneumatic device from a reference surface, whereby the sealing ridge is held parallel with said reference surface.

7. Slit seal as defined in claim 6 in a pressure chamber for a conveyor belt, in which the reference surface is the conveyor belt.

8. Slit seal as defined in claim 9, in which means are provided for supplying pressure media of different pressures to said two tubes.

9. Sealing means as defined in claim 1, in which the sealing ridge is attached to said pressure chamber along two parallel resilient tubes adapted to contain a pressure medium.

10. Slit seal as defined in claim 1, in which the slit has a constant thickness in the direction of the pressure medium flow.

11. Slit seal as defined in claim 6, in which the slit has a constant thickness in the direction of the pressure medium flow.

* * * * *